(12) United States Patent
Fernandes et al.

(10) Patent No.: US 9,495,333 B2
(45) Date of Patent: *Nov. 15, 2016

(54) CONTRACT AUTHORING SYSTEM AND METHOD

(71) Applicants: Shawn Fernandes, Mumbai (IN); Aatish Dedhia, Mumbai (IN)

(72) Inventors: Shawn Fernandes, Mumbai (IN); Aatish Dedhia, Mumbai (IN)

(73) Assignee: ZYCUS INFOTECH PVT. LTD., Mumbai (IN)

( * ) Notice: Subject to any disclaimer, the term of this patent is extended or adjusted under 35 U.S.C. 154(b) by 142 days.

This patent is subject to a terminal disclaimer.

(21) Appl. No.: 14/588,591

(22) Filed: Jan. 2, 2015

(65) Prior Publication Data
US 2015/0121211 A1    Apr. 30, 2015

Related U.S. Application Data

(63) Continuation-in-part of application No. 13/178,560, filed on Jul. 8, 2011, now Pat. No. 8,954,839.

(30) Foreign Application Priority Data

May 16, 2011 (IN) .......................... 1480/MUM/2011

(51) Int. Cl.
| | |
|---|---|
| G06F 17/00 | (2006.01) |
| G06F 17/21 | (2006.01) |
| G06Q 10/10 | (2012.01) |
| G06Q 50/18 | (2012.01) |
| G06F 17/27 | (2006.01) |
| G06F 17/24 | (2006.01) |

(52) U.S. Cl.
CPC ......... *G06F 17/211* (2013.01); *G06F 17/2745* (2013.01); *G06Q 10/10* (2013.01); *G06Q 50/18* (2013.01); *G06F 17/243* (2013.01)

(58) Field of Classification Search
CPC ........ G06F 17/24; G06F 17/25; G06T 11/60; A63F 2300/5553; A63F 2300/6623
USPC ................................ 715/201, 202, 230, 255
See application file for complete search history.

(56) References Cited

U.S. PATENT DOCUMENTS

| | | | |
|---|---|---|---|
| 2012/0159300 A1* | 6/2012 | Vincent, III | ........ G06F 17/2247 715/222 |
| 2012/0179961 A1* | 7/2012 | Stollman | ........... G06F 17/30893 715/243 |

* cited by examiner

*Primary Examiner* — Patrick Riegler
*Assistant Examiner* — Jenq-Kang Chu
(74) *Attorney, Agent, or Firm* — Preston Smirman; Smirman IP Law, PLLC

(57) ABSTRACT

A computer based system and method for contract authoring. The method may receive an external contract document in electronic form, wherein the external contract document comprises a plurality of text portions relating to a plurality of contract component types, respectively. The method may access a knowledge base describing a plurality of text patterns that identify with the plurality of the contract component types, respectively. Moreover, the method may process the external contract document utilizing the knowledge base to automatically identify the plurality of the contract component types for the plurality of the text portions in the contract document, respectively.

14 Claims, 6 Drawing Sheets

500

600 ⬎

650          610 : Title

Extraction Report | Extracted and Classified Text

☐ Title (1)

☐ Section Title (3)

☐ Clause Title (10)

☐ Clause Text (10)

☐ Unclassified (0)

IT Purchase Agreement with Supplier

This agreement is between the following parties for the supply of certain goods as described below:

The Customer:     ABC Inc.            Contact:    John Doe

The Supplier:     XYZ Inc.            Contact:    Mike Doe

Effective Date and Term:
This Agreement shall become effective as of May 01, 2010 (the "Effective Date") notwithstanding the date of signature and continue until May 01, 2015, unless terminated earlier in accordance with the terms of this Agreement (the "Term").

Section 1.01  Definitions

For the purpose of this Agreement:

1.1 "Business Day" shall mean
   a) Any day that is not a Saturday, Sunday or statutory holiday in the jurisdiction of the "ZCM Inc." Site identified in the Order.

1.2 "Order" shall mean
   a) Any order by "ZCM Inc." of Goods from Supplier through use of a purchase order, on-line ordering and/or through use of a P-card.

1.3 "Supplier" shall mean
   a) "Dell Inc." or anyone of its Affiliates listed in Schedule B.

620: Section Title

Section 1.02  Legal Terms

630: Clause Title 2.1 Indemnification

640: Clause Text

"The Supplier" shall be liable for and agrees to indemnify and hold "The Customer", its officers, directors, affiliates, representatives, agents and, employees harmless from and against any and all liability, damages, demands, claims, actions, proceedings, suits, judgments and reasonable expenses that may be brought against or suffered by "The Customer" as a result of Supplier's: negligent performance or non-performance of its obligations under this Agreement.

2.2 Insurance

"The Supplier" shall maintain commercial general liability insurance, including blanket contractual liability insurance covering the obligations of Supplier under this Agreement which insurance shall afford limits of not less than $5,000,00 for each occurrence.

Figure 6

CONTRACT AUTHORING SYSTEM AND METHOD

CROSS-REFERENCE TO RELATED APPLICATION

The instant application is a continuation-in-part of U.S. patent application Ser. No. 13/178,560, filed Jul. 8, 2011, pending, and claims priority to Indian Patent Application Ser. No. 1480/MUM/2011, filed May 16, 2011, the entire specifications of both of which are expressly incorporated herein by reference.

FIELD OF THE INVENTION

The present invention is generally related to computer based or implemented systems and methods for contract authoring.

BACKGROUND OF THE INVENTION

Contracts are often required in business-to-business transactions. As an example, contracts are often required during procurement of materials and services. As another example, contracts are often required during the sales process. Conventionally, the computer assisted contract authoring techniques utilize pre-existing contract templates provided in the computer system. These conventional techniques have a drawback that they may not utilize the contract documents that are received from external parties as a basis to author new contracts, because the templates for the external contract documents may not be pre-existing in the user's computer system. However, in practice, it is often required to prepare contracts based upon the contract documents received from the external parties.

Accordingly, there exists a need for new and improved computer based or implemented systems and methods for contract authoring that overcome the disadvantages of the conventional techniques so as to facilitate the efficiency of business functions involving contracts.

SUMMARY OF THE INVENTION

It is an object of the present invention to provide computer based or implemented systems and methods for contract authoring. More particularly, the present invention provides techniques for contract authoring that are based on the contract documents that are received from external parties. For example, these contract documents may be provided by the supplier (for procurement contract), the customer (for sales contract), and so forth.

In a specific embodiment of the present invention, a computer based or implemented system for contract authoring is provided. The system comprises a processor unit and a computer readable medium storing instructions executable by the processor unit to perform the step of receiving an external contract document in electronic form. The external contract document may comprise a plurality of text portions relating to a plurality of contract component types, respectively. Any contract component type may be a contract title, a section, a clause title, or a clause text. Moreover, the instructions are executable to perform the steps of accessing a knowledge base describing a plurality of text patterns that identify with the plurality of the contract component types, respectively; and processing the external contract document utilizing the knowledge base to automatically identify the plurality of the contract component types for the plurality of the text portions in the contract document, respectively. The instructions are also executable to perform the steps of displaying the external contract document on a computer screen, and displaying an indication of the plurality of the contract component types that are identified and that are associated with the plurality of the text portions in the contract document, respectively.

The present invention also provides associated methods for information extraction from the external contract document. Methods and systems for authoring the new contract document based upon the extracted information from the external contract document are also provided.

The details of one or more implementations of the invention are set forth in the accompanying drawings and the description below. Other features and advantages of the invention will become apparent from the description, the drawings, and the claims.

In accordance with one embodiment of the present invention, a computer based system for contract authoring is provided, comprising:
  a processor unit;
  a computer screen operably associated with the processor unit;
  a non-transitory computer readable medium operably associated with the processor unit, the computer readable medium storing instructions executable by the processor unit to perform the steps of:
    receiving an unprocessed external contract document in electronic form, the external contract document comprising a plurality of text portions relating to a plurality of contract component types, wherein any contract component type is one of a contract title, a section title, a clause title, and a clause text;
    accessing a heuristic system describing a plurality of text patterns that identify with the plurality of the contract component types;
    processing the external contract document utilizing the heuristic system to automatically identify and extract the plurality of the contract component types for the plurality of the text portions in the external contract document;
    wherein the heuristic system is selectively operable to automatically identify and extract at least one title from the external contract document;
    wherein the heuristic system is selectively operable to automatically identify and extract at least one clause text from the external contract document;
    displaying the external contract document on the computer screen; and
    simultaneously displaying a separate indication of the plurality of the contract component types that have been identified and extracted in the processing step as being associated with the plurality of the text portions in the external contract document;
    wherein the indication includes a tree structure showing separate component types and their inter-relationships that have been identified and extracted in the processing step;
    wherein the tree structure comprises a total number of each separate component type that has been identified and extracted in the processing step.

In accordance with an alternative embodiment of the present invention, a computer based method for contract authoring is provided, comprising:
  providing a processor unit;
  providing a computer screen operably associated with the processor unit;
  providing a non-transitory computer readable medium operably associated with the processor unit, the computer readable medium storing instructions executable by the processor unit to perform the steps of:

receiving an unprocessed external contract document in electronic form, the external contract document comprising a plurality of text portions relating to a plurality of contract component types, wherein a contract component type is one of a contract title, a section title, a clause title, and a clause text;

accessing a heuristic system describing a plurality of text patterns that identify with the plurality of the contract component types;

processing the external contract document utilizing the heuristic system to automatically identify and extract the plurality of the contract component types for the plurality of the text portions in the external contract document;

wherein the heuristic system is selectively operable to automatically identify and extract at least one title from the external contract document;

wherein the heuristic system is selectively operable to automatically identify and extract at least one clause text from the external contract document;

displaying the external contract document on the computer screen; and simultaneously displaying a separate indication of the plurality of the contract component types that have been identified and extracted in the processing step as being associated with the plurality of the text portions in the external contract document;

wherein the indication includes a tree structure showing separate component types and their inter-relationships that have been identified and extracted in the processing step;

wherein the tree structure comprises a total number of each separate component type that has been identified and extracted in the processing step.

BRIEF DESCRIPTION OF THE DRAWINGS

FIG. 6 illustrates an exemplary computer screenshot that facilitates presentation of information extracted from the contract document to user, according to one embodiment of the present invention.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

Figure 1:
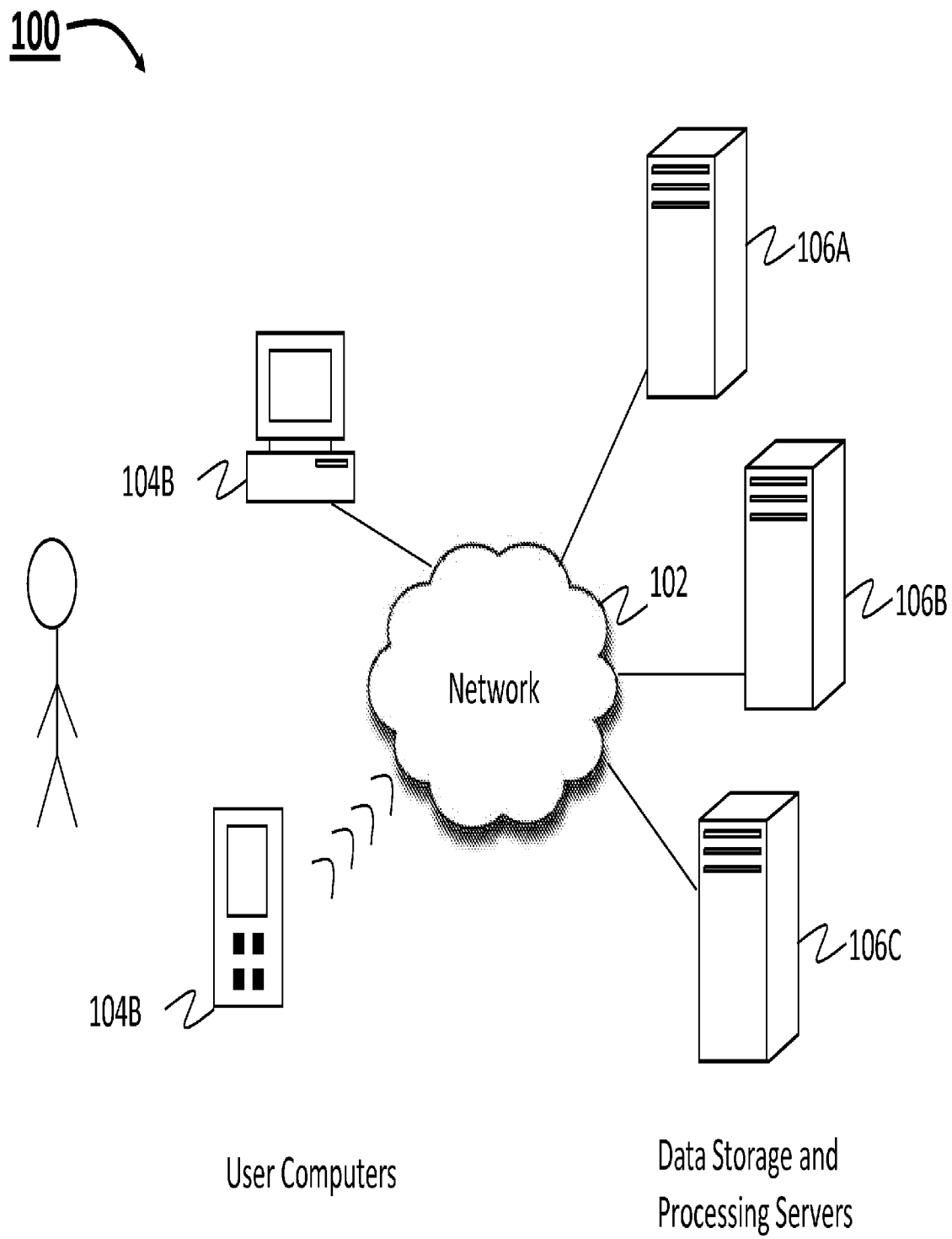
FIG. 1 illustrates an exemplary computer network environment system appropriate for carrying out one or more embodiments of the present invention.

FIG. 1 illustrates an exemplary networked computer system 100 that may provide an environment to practice several embodiments of the present invention. As shown in FIG. 1, multiple end user computer systems 104 and multiple server computer systems 106 may be coupled to a computer network 102. For example, the computer network 102 may be a private network of the organization. In alternative embodiment, the computer network 102 may include the local area network (LAN). In yet another alternative embodiment, it may include the Internet. The end user computer systems 104 may include, without limitation, desktop computers, laptop computers, personal digital assistant (PDAs), and smart phones. The computer systems 104, 106 may exchange information using the computer network 102.

The servers 106 store digitized content that may be accessed (e.g., read, downloaded, searched, and/or changed as appropriate) over the computer network. A specific portion of the content is often identified using a hyperlink. The content stored in one server may also be accessed by another server and by the end user computer system. Popular techniques for accessing the content include HTTP (HyperText Transfer Protocol) and HTTPS (HypterText Transfer Protocol Secure), though other techniques may also be used. Access to some portions of the content may require authentication and/or authorization for access.

Depending upon certain embodiments of the present invention, the servers 106 and the computer systems 104 may be configured to perform certain acts. For example, the servers 106 and the computer systems 104 may include software that may facilitate performing these acts. These acts may include various acts performed by the "user interaction module," by the "information extraction module," by the "contract authoring module," for interaction between the "user interaction module" and the "information extraction module" and/or the like.

Figure 2:
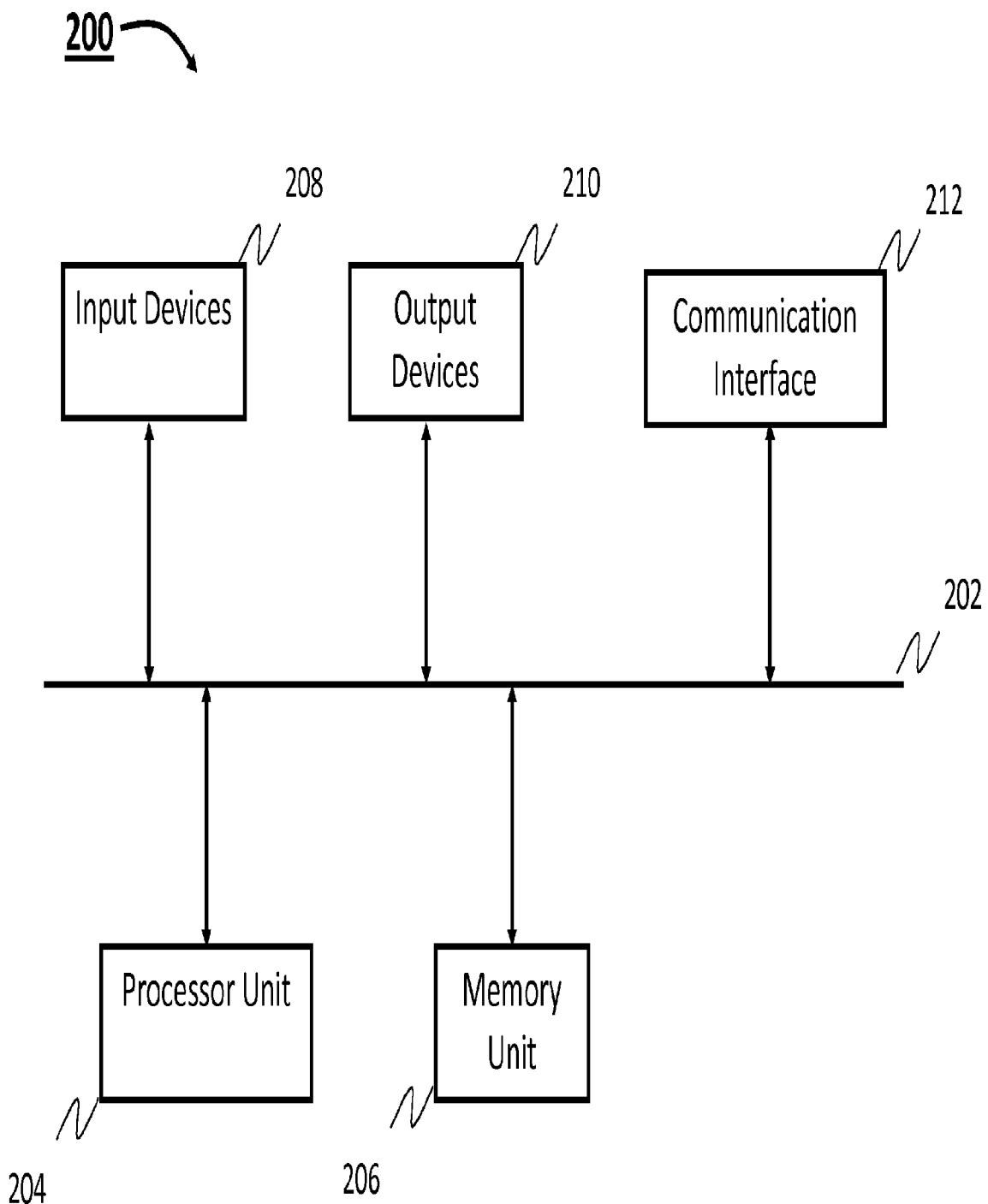
FIG. 2 illustrates an exemplary computer system that may provide a computing platform to practice one or more embodiments of the present invention.

FIG. 2 illustrates an exemplary implementation of any of the servers 106 or any of the end user computer systems 104, according to one embodiment of the present invention. The bus 202 permits communication among the components. The processor unit 204 may include one or more microprocessors, microcontrollers, RISC processors, CISC processors, and/or the like. The processor unit may interpret and execute instructions. The memory unit 206 may include any type of one or more volatile storage devices, for example, random access memory (RAM). The memory unit 206 may in addition, or alternatively, include any type of one or more persistent storage devices, for example read only memory (ROM), read write memory, hard disc, flash memory and/or the like. The memory unit may store information and instructions for execution by the processor unit 204.

The input devices 208 may include one or more mechanisms that permit an operator to input information, such as a keyboard, mouse, pen, magnetic drives, optical drives and/or the like. The output devices 210 may include one or more mechanisms that output information to the operator, including a display, a printer, a speaker and/or the like. The communication interface 212 may include any transceiver mechanism that enables communication with other devices and systems via a network. For example, the communication interface may include Ethernet interface, optical network interface, wireless interface and/or the like.

Figure 3:
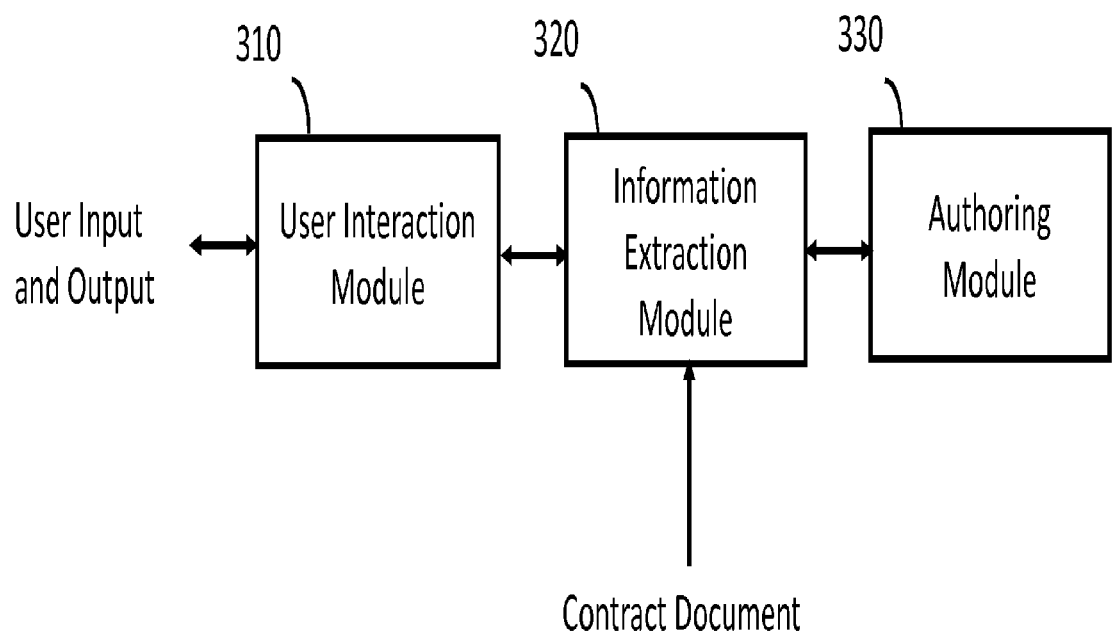
FIG. 3 illustrates an exemplary schematic of a system for contract authoring, according to one embodiment of the present invention.

FIG. 3 illustrates an exemplary schematic 300 of a system for contract authoring according to one embodiment of the present invention. As shown in FIG. 3, the system 300 may comprise various modules. Each of these modules may be a hardware module, a software module, or combination thereof. Moreover, depending upon the embodiment, each of the modules may reside on a single computer system or may be distributed across a plurality of interconnected computers. The user interaction module 310 provides an interface between the user and a machine, and performs acts such as receiving input from the user and providing an output to the user. In one embodiment, the user interaction modules implements a user interface using a web browser. The information extraction module 320 may process the contract documents to extract and classify the portions of information in the documents. The contract authoring module 330 may perform various acts associated with assembling or preparing a contract.

Figure 4:
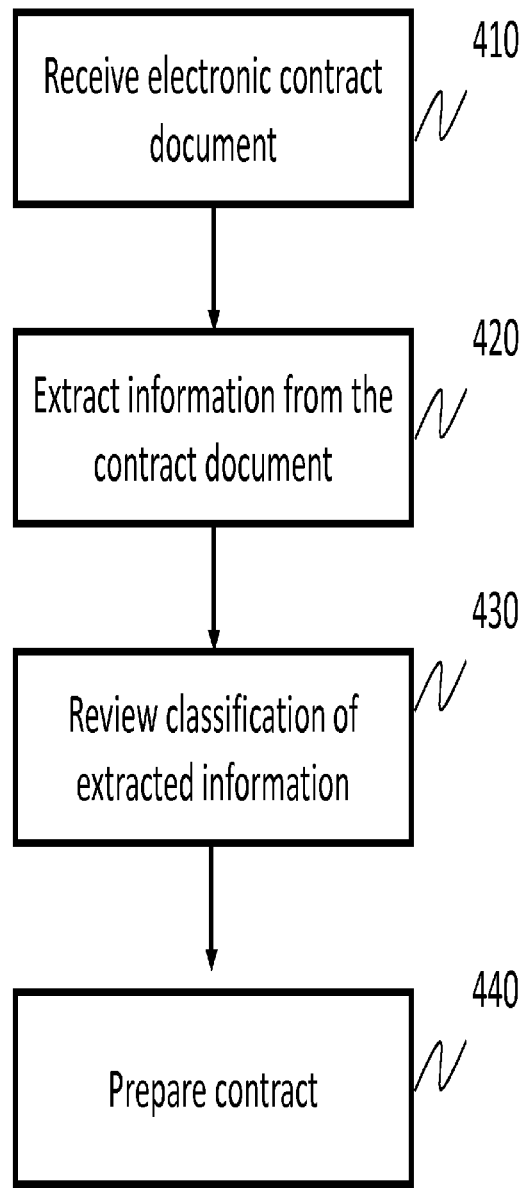
FIG. 4 illustrates an exemplary flow of steps in a method for contract authoring, according to one embodiment of the present invention.

An exemplary flowchart 400 illustrating several steps in a method for contract authoring according to one embodiment of the present invention is shown in FIG. 4. As shown in FIG. 4, the method may receive a contract document in electronic form at step 410. Preferably, the contract document is received from the external party. Notably, the template of the contract document is not pre-existing in the system. The template for a document in this context refers to a database of different portions of text in the document such as clauses, clause titles, section titles, contract titles, definitions, and/or the like, that may be used to assemble a new contract. Preferably, the template facilitates selecting various portions of text from the database to construct the contract document. According to one embodiment of the present invention, the receiving of the external contract document may be facilitated by way of an input from the user in a computer screen (for example, as facilitated by the user interaction module 310). For example, the user may input a reference to a location in the computer memory (e.g., file path) or to a location in the computer network (e.g., URL) from where the external contract document may be received.

Figure 5:
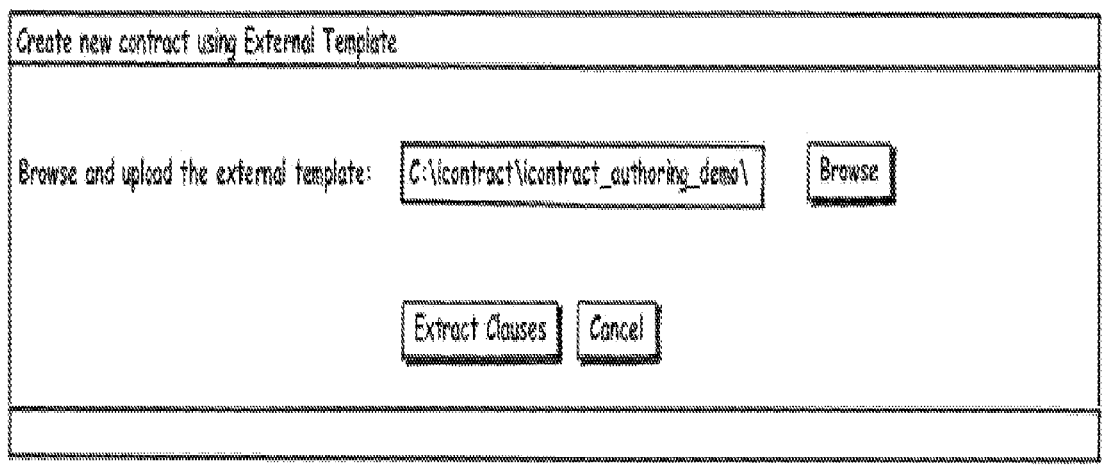
FIG. 5 illustrates an exemplary computer screenshot that facilitates receiving external contract documents into the contract authoring system, according to one embodiment of the present invention.

An exemplary computer screenshot to facilitate receiving the external contract document is illustrated in FIG. 5. Preferably, the received contract document is in a text readable form such as MICROSOFT WORD document, PDF document, Rich Text Format (RTF), Text Format (txt), and/or the like. Alternatively, techniques such as optical character recognition (OCR) may be employed to convert the received contract document into text readable form.

The received external contract document typically comprises a plurality of clauses arranged in flowing paragraphs spanning multiple pages. The clauses may include contractual terms, payment terms, references to other documents, and/or the like. In one embodiment, the clauses are organized into sections and titles for improved readability. An exemplary contract illustrated in FIG. 6 shows a contract title (610), section title (620), clause title (630), and clause text (640).

At step 420, the method may process the received contract document in order to extract clauses, sections and titles from it. In one embodiment of the present invention, the information extraction module (320) may perform this extraction task. For the purpose of information extraction, the present invention may utilize certain heuristics. The heuristics may be pre-configured in the system. Users may also provide their own heuristics or alter the pre-configured heuristics to suit a particular contract document.

An exemplary heuristic technique for information extraction is described below:

1. The smallest unit of the contract is a clause.
2. Clause may have clause title.
3. Clauses may be grouped into sections. The section may have a title.
4. A contract as a whole may have a title.
5. Clauses, clause titles, section titles, and contract title may be distinguished on the basis of font style. The font style may comprise one or more of font face, font family, font size, and font texture (e.g., bold, underlined, italics, and/or the like).
6. The text style that is found most frequently may be considered as clause text.
7. The text style that is found to precede the clause text most frequently may be considered as the clause title.
8. If there is no specific text style preceding the clause text, a check may be done to see if the clause title is a group of words in capital case at beginning of the clause text.
9. If a clause title is found, then the text style that is found to precede the clause title most of the times may be considered to be the section title.
10. The contract title may be the text that is found at the beginning of the document, or it may be the text with the largest font size in the document. Alternatively, the title may be identified as the text at the top of the page.

It should be noted that the specific heuristics described above are exemplary only. Alternative heuristics may also be used in addition to, or in lieu of, the specific technique described above. For example, in one embodiment, the text string pattern matching feature may include identifying specific key words (e.g., WHEREAS, Definitions, Indemnification, Payment, and/or the like) in the contract document to identify types for certain portions of text in the document. In one embodiment, the system may log various text string patterns that may be manually classified by the user, based on which the system may generate new or modified versions of the existing heuristics.

In accordance with a non-limiting example, use of the heuristic technique described above may be employed to extract clauses from the external template and identify a subset of clauses which are "critical" and/or "risk bearing," and accordingly, be marked as mandatory to be reviewed (e.g., by the user's legal department).

The steps to identify potentially "critical" and/or "risk bearing" clauses based on heuristic techniques may include the following illustrative procedures.

If the clause text is identified to contain ALL CAPS letters, the relevant clause may be marked as "critical" and/or "risk bearing" and mandatory to be reviewed by the user's legal department.

By way of a non-limiting example, the following exemplary disclaimer of warranty clause may be extracted and identified as being "critical" and/or "risk bearing" and thus subject to review by the user's legal department.

DISCLAIMER OF WARRANTY

LICENSEE HEREBY EXPRESSLY AGREES AND ACKNOWLEDGES THAT, EXCEPT AS PROVIDED IN THIS AGREEMENT, THE SOFTWARE IS PROVIDED "AS IS" WITHOUT ANY REPRESENTATIONS, CONDITIONS, WARRANTIES OR COVENANTS WHATSO-

EVER WITH RESPECT TO THE SOFTWARE OR ANY WORK OR SERVICES PERFORMED BY COMPANY OR ITS EMPLOYEES, CONSULTANTS OR AGENTS, INCLUDING WITHOUT LIMITATION, ANY EXPRESS, STATUTORY OR IMPLIED REPRESENTATIONS, WARRANTIES OR CONDITIONS OF MERCHANTABILITY, MERCHANTIBLE QUALITY, SATISFACTORY QUALITY OR FITNESS FOR A PARTICULAR PURPOSE, OR ARISING OTHERWISE IN LAW OR FROM A COURSE OF DEALING OR USAGE OF TRADE, ALL OF WHICH ARE EXPRESSLY DISCLAIMED AND EXCLUDED.

In accordance with another non-limiting example, if the clause text is preceded with a clause title that includes certain specific key terms/phrases such as, but not limited to, indemnification, liability, limitation of liability, and/or the like, then those clauses may be extracted and/or identified as "critical" and/or "risk bearing" clauses, thus necessitating a mandatory review, e.g., by the user's legal department.

By way of a non-limiting example, the following exemplary indemnification clause may be extracted and identified as being "critical" and/or "risk bearing" and thus subject to review by the user's legal department, even though the clause text is not in ALL CAPS letters.

INDEMNIFICATION

Company will, at its sole option, defend, indemnify and hold harmless Licensee from and against any and all liability, suits, claims, actions, proceedings, losses, damages, judgments and costs (each, a "Claim") to the extent that such Claim arises out of or is in relation to any allegation that the Software infringes any patent or copyright or other proprietary right of any third party, provided that Company has no liability for any Claim based upon Licensee's use of the Software in any manner for which it was not intended; provided further that Company has been given prompt written notice of each such Claim, and the right to control and direct the investigation, defense and settlement of each such Claim. If the Software, or any part of it, is in Company' opinion, likely to or does become the subject of a Claim for infringement of a third party's proprietary rights, Company, at its sole option, may (i) obtain the right for Licensee to continue to use the Software, (ii) substitute equivalent of Software, or (iii) modify the Software so as to make it non-infringing. The foregoing states Company' entire liability to Licensee with respect to infringement.

By way of a non-limiting example, the following exemplary limitation of liability clause may be extracted and identified as being "critical" and/or "risk bearing" and thus subject to review by the user's legal department, even though the clause text (as well as the clause title) is not in ALL CAPS letters.

Limitation of Liability

Notwithstanding any other term of this agreement to the contrary, in no event shall Company be liable to licensee or any third party for any direct, indirect, special, incidental, consequential, punitive or exemplary damages or loss of any kind (including but not limited to loss of profit, loss of revenues, business interruption, loss of business information, increased costs of operation or other commercial or economic loss, litigation costs and the like) howsoever caused, in connection with the supply, use or performance of the software, whether arising out of contract, tort (including without limitation negligence) or otherwise, even if Company has been advised of the possibility of such damages or such damages are foreseeable. The maximum liability shall be limited to the fees paid by licensee to Company in the twelve (12) month period immediately preceding the event giving rise to such claim provided that, in those jurisdictions where limitations on liability for consequential or incidental damages are not permitted or curtailed, in such jurisdictions liability of Company shall be limited to the extent permitted by law.

Once the relevant clauses have been identified, they may be further "drilled down" to assess whether the clauses identified are indeed "critical" and/or "risk bearing" based on heuristics, and if so, they may be extracted and put into a different track as a separate set of clauses as a separate document. Furthermore, the relevant clauses that have been extracted may be marked by comments as "critical" and/or "risk bearing" clauses.

In one embodiment of the present invention, the extracted information may be presented to user in a classified form. An exemplary computer screenshot of such information presentation is illustrated in FIG. 6. As shown in FIG. 6, in this embodiment the structure of the contract that is extracted or interpreted as described above, is presented in the form of tree structure (650).

At step 430, the method facilitates the user to review the extracted information. It provides for the user to review the classification of text, rectify any misclassified text, assign category to unclassified text, and/or the like.

Moreover, at step 440, the method facilitates contract authoring. For contract authoring, the user may select, delete, and modify portions of the text that are extracted and classified as above. The user may also add additional portions of text to the contract template. Advantageously, the extraction and classification performed on external contract documents according to the present invention makes such contract authoring efficient, for example, compared to directly working with an original external contract document. Such templates may also facilitate the creation of future contracts that, for example, resemble present contracts.

In some applications, the present invention described above may be provided as elements of an integrated software system, in which the features may be provided as separate elements of a computer program. Some embodiments may be implemented, for example, using a computer-readable storage medium (e.g., non-transitory) or article that may store an instruction or a set of instructions that, if executed by a processor, may cause the processor to perform a method in accordance with the embodiments. Other applications of the present invention may be embodied as a hybrid system of dedicated hardware and software components. Moreover, not all of the features described above need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that may store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device. Examples of a computing device may include, but are not limited to, an electronic book reading device, a computer workstation, a terminal computer, a server computer, a handheld device (e.g., a tablet computer, a personal digital assistant "PDA", a mobile telephone, a Smartphone, and/or the like), a web appliance, a network router, a network switch, a network bridge, any machine capable of executing a sequence of instructions that specify an action to be taken by that machine, and any combinations thereof. In one example, a computing device may include and/or be included in, a kiosk.

The computer device may also include an input device. In one example, a user of the computer device may enter commands and/or other information into computer device via an input device. Examples of an input device may include, but are not limited to, an alpha-numeric input device (e.g., a keyboard), a pointing device, a joystick, a gamepad, an audio input device (e.g., a microphone, a voice response system, and/or the like), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device via a storage device (e.g., a removable disk drive, a flash drive, and/or the like) and/or a network interface device. A network interface device, such as network interface device may be utilized for connecting the computer device to one or more of a variety of networks, such as a network, and one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, and/or the like) may be communicated to and/or from the computer device via a network interface device.

The computer device may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer based system for contract authoring, comprising:
   a processor unit;
   a computer screen operably associated with the processor unit;
   a non-transitory computer readable medium operably associated with the processor unit, the computer readable medium storing instructions executable by the processor unit to perform the steps of:
   receiving an unprocessed external contract document in electronic form, the external contract document comprising a plurality of text portions relating to a plurality of contract component types, wherein any contract component type is one of a contract title, a section title, a clause title, and a clause text;
   accessing a heuristic system describing a plurality of text patterns that identify with the plurality of the contract component types;
   processing the external contract document utilizing the heuristic system to automatically identify and extract the plurality of the contract component types for the plurality of the text portions in the external contract document;
   wherein the heuristic system is selectively operable to automatically identify and extract at least one title from the external contract document;
   wherein the heuristic system is selectively operable to automatically identify and extract at least one clause text from the external contract document;
   displaying the external contract document on the computer screen; and
   simultaneously displaying a separate indication of the plurality of the contract component types that have been identified and extracted in the processing step as being associated with the plurality of the text portions in the external contract document;
   wherein the indication includes a tree structure showing separate component types and their inter-relationships that have been identified and extracted in the processing step;
   wherein the tree structure comprises a total number of each separate component type that has been identified and extracted in the processing step.

2. The system of claim 1, wherein the processing of the external contract document is based at least upon a font style and a relative frequency of the font style in the external contract document.

3. The system of claim 2, wherein the processing of the external contract document is based at least upon a relative frequency of a font style that is different from the font style of the clause text and that precedes the clause text.

4. The system of claim 1, wherein the processing of the external contract document to identify and extract the clause text is based at least upon identifying a font style that occurs a highest number of times in the contract document.

5. The system of claim 4, wherein the processing of the external contract document to identify and extract the clause title is based at least upon identifying a font style that is different from the font style of the clause text and that precedes the clause text a highest number of times in the contract document.

6. The system of claim 5, wherein the processing of the external contract document to identify and extract the contract title comprises identifying a font style with a font size larger than any other font style in the contract document.

7. The system of claim 1, wherein the computer readable medium stores further instructions executable by the processor unit to perform the step of receiving user input to re-classify at least one portion of text in the contract document from a first component type to a second component type.

8. The system of claim 1, wherein the computer readable medium stores further instructions executable by the processor unit to receive an action input to prepare a new contract document.

9. The system of claim 8, wherein the action input comprises at least one selected from the group consisting of selecting a portion of text, deleting a portion of text, modifying a portion of text, and adding a portion of text.

10. The system of claim 9, wherein the action input is provided by a user utilizing the indication of the plurality of the contract component types that have been identified and extracted in the external contract document.

11. A computer based method for contract authoring, comprising:
providing a processor unit;
providing a computer screen operably associated with the processor unit;
providing a non-transitory computer readable medium operably associated with the processor unit, the computer readable medium storing instructions executable by the processor unit to perform the steps of:
receiving an unprocessed external contract document in electronic form, the external contract document comprising a plurality of text portions relating to a plurality of contract component types, wherein a contract component type is one of a contract title, a section title, a clause title, and a clause text;
accessing a heuristic system describing a plurality of text patterns that identify with the plurality of the contract component types;
processing the external contract document utilizing the heuristic system to automatically identify and extract the plurality of the contract component types for the plurality of the text portions in the external contract document;
wherein the heuristic system is selectively operable to automatically identify and extract at least one title from the external contract document;
wherein the heuristic system is selectively operable to automatically identify and extract at least one clause text from the external contract document;
displaying the external contract document on the computer screen; and
simultaneously displaying a separate indication of the plurality of the contract component types that have been identified and extracted in the processing step as being associated with the plurality of the text portions in the external contract document;
wherein the indication includes a tree structure showing separate component types and their inter-relationships that have been identified and extracted in the processing step;
wherein the tree structure comprises a total number of each separate component type that has been identified and extracted in the processing step.

12. The method of claim 11, wherein the processing of the external contract document is based at least upon a font style and a relative frequency of the font style in the external contract document.

13. The method of claim 12, wherein the processing of the external contract document is based at least upon a relative frequency of a font style that is different from the font style of the clause text and that precedes the clause text.

14. The method of claim 11, further comprising authoring a contract document utilizing the indication of the plurality of the contract component types that have been identified and extracted in the external contract document.

* * * * *